(12) United States Patent
Anandani (10) Patent No.: US 8,571,017 B2
(45) Date of Patent: *Oct. 29, 2013

(54) SIP PARSER/GENESYS-SIP PARSER-TO PARSE SIP TELEPHONY EVENTS AND DECRYPT THE USERDATA IN IP TELEPHONY

(75) Inventor: Rahul Anandani, Schaumburg, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,761

(22) Filed: Sep. 14, 2012

(65) Prior Publication Data

US 2013/0019022 A1    Jan. 17, 2013

Related U.S. Application Data

(63) Continuation of application No. 12/614,797, filed on Nov. 9, 2009, now Pat. No. 8,295,274.

(51) Int. Cl.
*H04L 12/66* (2006.01)
*G06F 15/16* (2006.01)

(52) U.S. Cl.
USPC .......................................... 370/352; 709/228

(58) Field of Classification Search
None
See application file for complete search history.

(56) References Cited

U.S. PATENT DOCUMENTS

| | | | |
|---|---|---|---|
| 7,120,141 B2 | 10/2006 | Kikinis | |
| 7,412,529 B2 | 8/2008 | Ryu | |
| 7,428,234 B2 | 9/2008 | Forte-McRobbie et al. | |
| 2006/0198309 A1 | 9/2006 | Cortes et al. | |
| 2007/0143858 A1* | 6/2007 | Hearty | 726/27 |
| 2008/0219243 A1* | 9/2008 | Silverman | 370/352 |
| 2008/0253321 A1* | 10/2008 | Gormley et al. | 370/329 |
| 2010/0080163 A1* | 4/2010 | Krishnamoorthi et al. | 370/312 |
| 2011/0195693 A1* | 8/2011 | Nagasawa et al. | 455/412.2 |

OTHER PUBLICATIONS

SIP: Protocol Overview, pp. 1-16, Copyright 2001 Radvison Ltd.

* cited by examiner

*Primary Examiner* — John Blanton
(74) *Attorney, Agent, or Firm* — Greenblum & Bernstein, P.L.C.

(57) ABSTRACT

An apparatus, method, and medium for retrieving information from an internet protocol network are provided. The apparatus includes a network interface that is in communication with the internet protocol network. The network interface accesses a plurality of session initiation protocol events and a plurality of non-session initiation protocol events via the internet protocol network. The plurality of session initiation protocol events are transmitted on the internet protocol network, and the plurality of non-session initiation protocol events are transmitted from a non-internet protocol network to the internet protocol network. An input receives a parsing parameter, and a processor parses the plurality of session initiation protocol events and the plurality of non-session initiation protocol events that are accessed by the network interface based on the parsing parameter. A reporter reports parsing results of the processor.

20 Claims, 3 Drawing Sheets

SIP PARSER/GENESYS-SIP PARSER-TO PARSE SIP TELEPHONY EVENTS AND DECRYPT THE USERDATA IN IP TELEPHONY

CROSS REFERENCE TO RELATED APPLICATION

The present application is a continuation application of U.S. patent application Ser. No. 12/614,797, filed Nov. 9, 2009. The disclosure of this document, including the specification, drawings, and claims, is incorporated herein by reference in its entirety.

BACKGROUND

1. Field of the Disclosure

The present disclosure relates to parsing session initiation protocol (SIP) events that are stored in SIP entities. More particularly, the present disclosure relates to parsing both standard SIP events and Genesys Telephony Server Common Part (TSCP) specific events that are stored in SIP entities.

2. Background Information

SIP is a fairly new signaling protocol for establishing, managing, and terminating multimedia communication sessions, such as voice and video sessions, across packet-switched communication networks. SIP was designed to provide a signaling and call setup protocol for a packet-switched communication network, such as an internet protocol (IP) network, that supports a superset of the call processing functions and features that are present in the public switched telephone network.

Recently, there has been a gradual shift away from the traditional time-division multiplexing (TDM) voice networks to SIP-based IP networks. However, since the existing TDM networks will not be replaced by SIP-based IP networks overnight, the SIP-based IP networks have been developed to integrate and interface with the TDM networks. As such, SIP-based IP networks are capable of supporting thousands of call events that may have originated from either SIP call events via the IP network or non-SIP call events via a TDM network.

DETAILED DESCRIPTION

In view of the foregoing, the present disclosure, through one or more of its various aspects, embodiments and/or specific features or sub-components, is thus intended to bring out one or more of the advantages as specifically noted below.

According to an embodiment of the present disclosure, a tangible computer-readable medium encoded with an executable computer program for retrieving information from an IP network is provided. The IP network includes a plurality of tangible SIP entities that exchange SIP events via the IP network. Each of the plurality of tangible SIP entities stores exchanged SIP events. The tangible computer-readable medium includes: an accessing code segment that, when executed, accesses the exchanged SIP events that are stored in one of the tangible SIP entities; a parsing code segment that, when executed, parses the exchanged SIP events that are stored in the one of the tangible SIP entities based on a parsing parameter; and a reporting code segment that, when executed, displays results of the parsing code segment on a display.

According to one aspect of the present disclosure, the IP network is in communication with a non-IP network via a tangible non-SIP entity that transmits non-SIP events to the plurality of tangible SIP entities. Each of the plurality of tangible SIP entities store received non-SIP events. The accessing code segment, when executed, accesses the exchanged SIP events and the received non-SIP events that are stored in the one of the tangible SIP entities, and the parsing code segment, when executed, parses the exchanged SIP events and the received non-SIP events that are stored in the one of the tangible SIP entities.

According to another aspect of the present disclosure, the received non-SIP events include Genesys Telephony Server Common Part Telephone Library events.

According to yet another aspect of the present disclosure, the one of the tangible SIP entities is a user agent.

According to still another aspect of the present disclosure, the one of the tangible SIP entities is one of a proxy server, a redirect server, and a registrar.

According to an additional aspect of the present disclosure, the accessing code segment, when executed, accesses the exchanged SIP events and the received non-SIP events that are stored in each of the plurality of tangible SIP entities, and the parsing code segment, when executed, parses the exchanged SIP events and the received non-SIP events that are stored in each of the plurality of tangible SIP entities based on the parsing parameter.

According to another aspect of the present disclosure, the parsing code segment, when executed, parses the exchanged SIP events and the received non-SIP events based on the parsing parameter and determines specific data for each of the exchanged SIP events and the received non-SIP events that corresponds to the parsing parameter, and the reporting code segment, when executed, displays the specific data for each of the exchanged SIP events and the received non-SIP events that corresponds to the parsing parameter on the display.

According to yet another aspect of the present disclosure, the parsing code segment, when executed, parses the exchanged SIP events and the received non-SIP events based on the parsing parameter and determines general data for the exchanged SIP events and the received non-SIP events that correspond to the parsing parameter, and the reporting code segment, when executed, displays the general data for the exchanged SIP events and the received non-SIP events that correspond to the parsing parameter on the display.

According to still another aspect of the present disclosure, the tangible computer-readable medium further includes a prompting code segment that, when executed, prompts, on the display, for the parsing parameter, and a receiving code segment that receives the parsing parameter via an input.

According to an additional aspect of the present disclosure, the accessing code segment, the parsing code segment, and the reporting code segment are platform independent.

According to another aspect of the present disclosure, each of the exchanged SIP events includes a start line, a header, and a body, and the parsing code segment, when executed, parses the start line of each of the exchanged SIP events that is stored in the one of the tangible SIP entities based on the parsing parameter.

According to yet another aspect of the present disclosure, each of the exchanged SIP events includes a start line, a header, and a body, and the parsing code segment, when executed, parses the header of each of the exchanged SIP events that is stored in the one of the tangible SIP entities based on the parsing parameter.

According to still another aspect of the present disclosure, each of the exchanged SIP events includes a start line, a header, and a body, and the parsing code segment, when executed, parses the body of each of the exchanged SIP events that is stored in the one of the tangible SIP entities based on the parsing parameter.

According to another embodiment of the present disclosure, a method for retrieving information from an IP network is provided. The IP network includes a plurality of tangible SIP entities that exchange SIP events via the IP network. Each of the plurality of tangible SIP entities store exchanged SIP events. The method includes: accessing the exchanged SIP events that are stored in one of the tangible SIP entities; parsing the exchanged SIP events that are stored in the one of the tangible SIP entities based on a parsing parameter; and displaying the results of the parsing the exchanged SIP events on a display.

According to one aspect of the present disclosure, the IP network is in communication with a non-IP network via a tangible non-SIP entity that transmits non-SIP events to the plurality of tangible SIP entities. Each of the plurality of tangible SIP entities stores received non-SIP events. The exchanged SIP events and the received non-SIP events that are stored in the one of the tangible SIP entities are accessed. The exchanged SIP events and the received non-SIP events that are stored in the one of the tangible SIP entities are parsed based on the parsing parameter. Thereafter, the results of parsing the exchanged SIP events and the received non-SIP events are displayed on the display.

According to an additional aspect of the present disclosure, the received non-SIP events include Genesys Telephony Server Common Part Telephone Library events.

According to another aspect of the present disclosure, the method further includes prompting, on the display, for the parsing parameter, and receiving, via an input, the parsing parameter.

According to another embodiment of the present disclosure, an apparatus for retrieving information from an IP network is provided. The IP network includes a plurality of tangible SIP entities that exchange SIP events via the IP network. Each of the plurality of tangible SIP entities store exchanged SIP events. The apparatus includes: a prompter that prompts, on a display, for a parsing parameter; a receiver that receives the parsing parameter; an accesser that accesses the exchanged SIP events that are stored in one of the tangible SIP entities; a parser that parses the exchanged SIP events that are stored in the one of the tangible SIP entities based on the parsing parameter; and a displayer that displays, on the display, results of the parser.

According to one aspect of the present disclosure, the IP network is in communication with a non-IP network via a tangible non-SIP entity that transmits non-SIP events to the plurality of tangible SIP entities. Each of the plurality of tangible SIP entities store received non-SIP events. The accesser accesses the exchanged SIP events and the received non-SIP events that are stored in the one of the tangible SIP entities. The parser parses the exchanged SIP events and the received non-SIP events that are stored in the one of the tangible SIP entities based on the parsing parameter.

According to an additional aspect of the present disclosure, the received non-SIP events include Genesys Telephony Server Common Part Telephone Library events.

Figure 1:
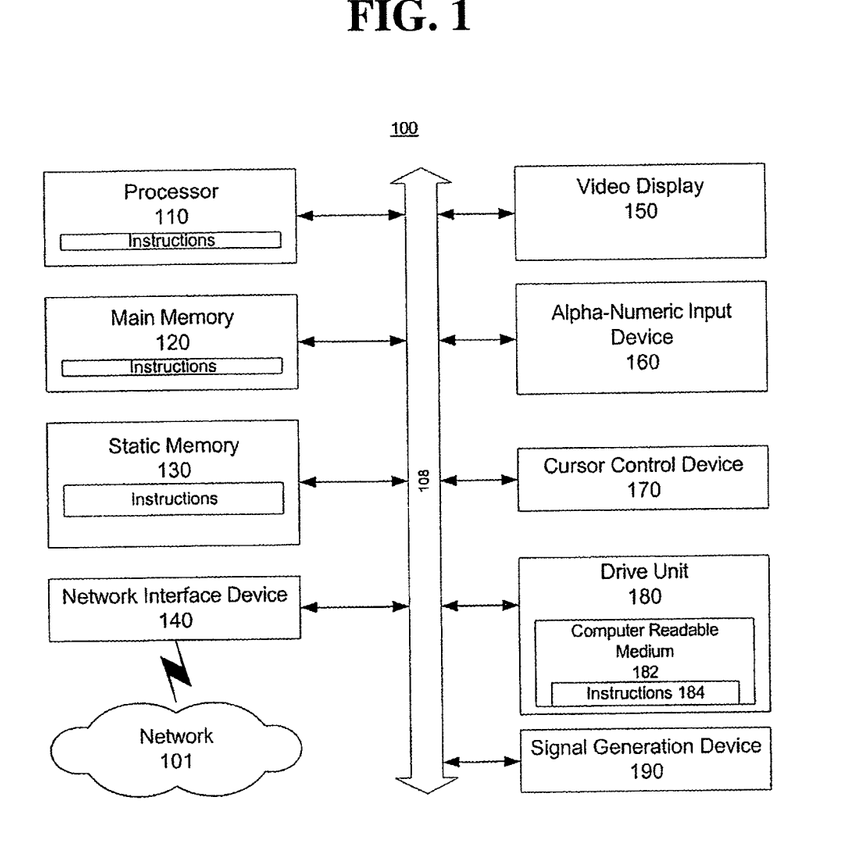
FIG. 1 shows an exemplary general computer system that includes a set of instructions for retrieving information from an IP network.

FIG. 1 is an illustrative embodiment of a general computer system, on which a method to provide a Genesys-SIP parser for parsing SIP telephony events and decrypting user data in IP telephony can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
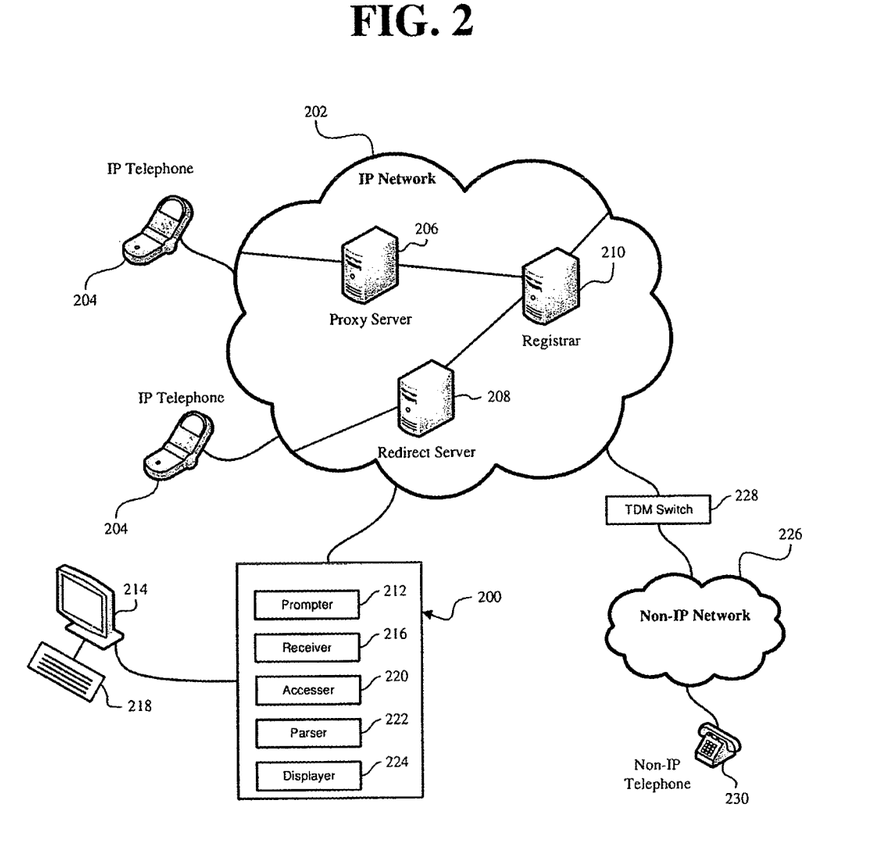
FIG. 2 is a schematic of a communication network that includes an apparatus for retrieving information from an IP network, according to an aspect of the present disclosure.

FIG. 2 provides a schematic of a communication network that includes an apparatus 200 for retrieving information from an IP network 202. The IP network 202 includes a plurality of tangible SIP entities 204, 206, 208, 210, such as, but not limited to, IP telephones 204, a proxy server 206, a redirect server 208, and a registrar 210. The tangible IP entities 204, 206, 208, 210 exchange SIP events via the IP network 202 to initiate, manage, and terminate communication sessions. Each of the tangible SIP entities 204, 206, 208, 210 store exchanged SIP events.

The apparatus 200 includes a prompter 212 that prompts, on a display 214, for a parsing parameter. The parsing parameter may be any parameter that is contained within or associated with the SIP events. For example, the parsing parameter may be, but is not limited to, the response type, response code, call construction, media masks and flags, call parties, call events and detail records, telephony events, call moving messages, inter server call control messages and sessions between the tangible SIP entities. Of course, those skilled in the art appreciate that the parsing parameter may also be any combination of parameters contained within the SIP events.

A receiver 216 of the apparatus 200 receives the parsing parameter from an input 218. The input 218 is shown in FIG. 2 as being a keyboard, however, those skilled in the art appreciate that an additional, or alternative, input 218 may also be used, such as a microphone.

After the parsing parameter is received, an accesser 220 accesses the exchanged SIP events that are stored in one of the tangible SIP entities 204, 206, 208, 210. In an embodiment of the present application, the accesser 220 may access the exchanged SIP events that are stored in a user agent, such as the IP telephones 204 as shown in FIG. 2. The user agent may be a user agent client that initiates a SIP request or a user agent server that receives and responds to a SIP request. In FIG. 2, the user agents are shown as IP telephones, however, those skilled in the art appreciate that the user agents may be alternative devices, such as, but not limited to, workstations, telephony gateways, call agents, automated answering services, etc. In an alternative embodiment of the present application, the accesser 220 may access the exchanged SIP events that are stored in one of the proxy server 206, the redirect server 208, and the registrar 210. In the embodiments described above, the accesser 220 access the exchanged SIP events stored in a single tangible SIP entity 204, 206, 208, 210. However, in alternative embodiments of the apparatus 200, the accesser 220 may access the exchanged SIP events that are stored in multiple tangible SIP entities 204, 206, 208, 210 or the accesser 200 may access the exchanged SIP events that are stored in all of the tangible SIP entities 204, 206, 208, 210.

A parser 222 of the apparatus 200 parses the exchanged SIP events that are stored in the accessed tangible SIP entity 204, 206, 208, 210 based on the parsing parameter. In an embodiment of the apparatus 200, the parser 222 may parse a start line of each of the exchanged SIP events. In alternative embodiments of the apparatus 200, the parser may parse a header or a body of the exchanged SIP events. Of course, those skilled in the art appreciate that in even further embodiments of the apparatus 200, the parser 222 may parse multiple ones of the start line, the header, and the body of each exchanged SIP event.

In an embodiment of the apparatus 200, the parser 222 may parse each exchanged SIP event to determine specific data for each of the exchanged SIP events that corresponds to the parsing parameter. In an alternative embodiment of the apparatus 200, the parser 222 may parse the exchanged SIP events based on the parsing parameter to determine general data for the exchanged SIP events that corresponds to the parsing parameter.

The apparatus 200 further includes a displayer 224 that displays the results of the parser 222 on a display 214. The display 214 is shown in FIG. 2 as being a monitor, however, those skilled in the art appreciate that other displays could also be used.

In the embodiment of the present application as shown in FIG. 2, the IP network 202 is in communication with a non-IP network 226 via a tangible non-SIP entity 228 that transmits non-SIP events to the plurality of tangible SIP entities 204, 206, 208, 210. The non-IP network 226 may be any circuit-switched network, such as, but not limited to, a public switched telephone network. The non-SIP entity 228 may be any entity for circuit-switched communication such as, but not limited to, a TDM switch. The non-SIP entity 228 is adapted to transmit the non-SIP events, such as control signals for a call, between the IP telephones 204 and a non-IP telephone 230. Each of the tangible SIP entities 204, 206, 208, 210 stores received non-SIP events.

According to an embodiment of the apparatus 200 as shown in FIG. 2, the accesser 220 access the exchanged SIP events and the received non-SIP events that are stored in one of the tangible SIP entities 204, 206, 208, 210. Thereafter, the parser 222 parses the exchanged SIP events and the received non-SIP events that are stored in the one of the tangible SIP entities 204, 206, 208, 210, and the displayer 224 displays the results of the parser 222. In this regard, the apparatus 200 parses both SIP events and non-SIP events.

In an embodiment of the apparatus 200 as described above, the non-SIP events include Genesys TSCP Telephone Library (TLib) events. Genesys integrates/interfaces with almost every kind of telephony switch, whether it is a TDM switch or a SIP switch. TDM switches generally generate non-SIP events when a call is moving on the switch, and Genesys TSCP TLib breaks the call elements into TSCP/TLib structure. In addition to parsing the SIP events, the parser 222 of the apparatus 200 works on top of the TSCP/TLib structure to parase the non-SIP events.

Figure 3:
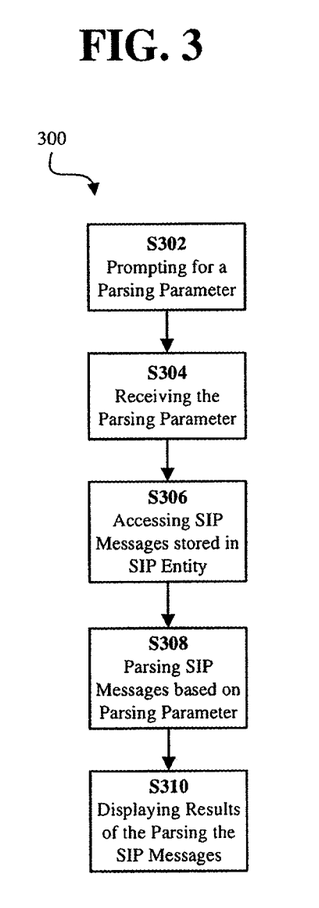
FIG. 3 is a flowchart of a method for retrieving information from an IP network, according to an aspect of the present disclosure.

As shown in FIG. 3, the present application further provides a method for retrieving information from an IP network 300. The IP network includes a plurality of tangible SIP entities that exchange SIP events via the IP network, wherein each of the plurality of tangible SIP entities store exchanged SIP events. The method 300 includes prompting, on a display, for a parsing parameter at S302. Thereafter, the parsing parameter is received at S304.

After the parsing parameter is received at S304, the exchanged SIP events that are stored in one of the tangible SIP entities are accessed at S306. The exchanged SIP events that are stored in the one of the tangible SIP entities are parsed based on the parsing parameter at S308. The results of parsing the exchanged SIP events are displayed on the monitor at S310.

In an embodiment of the method 300, the IP network is in communication with a non-IP network via a tangible non-SIP entity that transmits non-SIP events to the plurality of tangible SIP entities. Each of the plurality of tangible SIP entities store received non-SIP events. According to such an embodiment, the exchanged SIP events and the received non-SIP events that are stored in the one of the tangible SIP entities are accessed at step 306. Then, the exchanged SIP events and the received non-SIP events that are stored in the one of the tangible SIP entities are parsed based on the parsing parameter at S308. Thereafter, the results of parsing the exchanged SIP events and the received non-SIP events that are stored in the one of the tangible SIP entities are displayed on the display at S310. In an embodiment of the above-described method, the received non-SIP events include Genesys TSCP TLib events.

The present application further provides a tangible computer-readable medium encoded with an executable computer program for retrieving information from an IP network. The IP network includes a plurality of tangible SIP entities that exchange SIP events via the IP network, wherein each of the tangible SIP entities stores exchanged SIP events.

The tangible computer-readable medium includes an accessing code segment that, when executed, accesses the exchanged SIP events that are stored in one of the tangible SIP entities. In an embodiment of the tangible computer-readable medium, the accessing code segment accesses the exchanged SIP events that are stored in a user agent, such as an IP telephone. In an alternative embodiment of the tangible computer-readable medium, the accessing code segment accesses the exchanged SIP events that are stored in one of a proxy server, a redirect server, and a registrar. In an even further embodiment, the accessing code segment accesses the exchanged SIP events that are stored in a combination of SIP entities, such as user agents, proxy servers, redirect servers, and registrars.

The tangible computer-readable medium further includes a parsing code segment that, when executed, parses the exchanged SIP events that are stored in the one of the tangible SIP entities based on a parsing parameter. The parsing code segment may parse any of, including any combination of a start line, a header, and a body of the exchanged SIP events. Furthermore, the parsing code segment may determine specific data for each of the exchanged SIP events that corresponds to the parsing parameter. Alternatively, the parsing code segment may determine general data for the exchanged SIP events that corresponds to the parsing parameter.

After the parsing code segment parses the exchanged SIP events, a reporting code segment, when executed, displays results of the parsing code segment on a display. The display may be a monitor or any other display commonly known in the art.

In the embodiment of the tangible computer-readable medium, the IP network is in communication with a non-IP network via a tangible non-SIP entity that transits non-SIP events to the plurality of tangible SIP entities. The non-IP network may be any circuit-switched network, such as, but not limited to, a public switched telephone network. The non-SIP entity may be any entity for circuit-switched communication such as, but not limited to, a TDM switch. The non-SIP entity is adapted to transmit the non-SIP events, such as control signals for a call, between user agents, such as IP telephones, and non-IP devices, such as non-IP telephones. Each of the tangible SIP entities stores received non-SIP events.

According to the embodiment of the tangible computer-readable medium as described above, the accessing code segment, when executed, accesses the exchanged SIP events and the received non-SIP events that are stored in the one of the tangible SIP entities. Furthermore, the parsing code segment, when executed, parses the exchanged SIP events and the received non-SIP events that are stored in the one of the tangible SIP entities. In this regard, the parsing code segment parses both standard SIP events and non-SIP events. In an exemplary embodiment of such a tangible computer-readable medium as described above, the non-SIP events may be, for example, Genesys TSCP TLib events.

In an embodiment of the tangible computer-readable medium, the accessing code segment, the parsing code segment, and the reporting code segment are platform independent. As such, the code segments may be deployed on any platform, such as, but not limited to Unix and Windows servers. In an exemplary embodiment of the tangible computer readable medium, the code segments are coded in Perl so as to achieve platform independence.

An exemplary executable computer program that can be encoded on a tangible computer-readable medium for retrieving information from an IP network provides for parsing of standard SIP events as well as Genesys TSCP specific events. It finds specific call records or overall generic data based on certain key parameters. The exemplary executable computer program parses either a SIP server of a SIP client/proxy. It parses out the call construction, media masks and flags, call parties in the call, call events and call data records, telephony events, call moving messages, inter service call control messages and sessions between the SIP server and the SIP client/proxy. It even works on applications like Federation-Proxy, which is purely based on SIP communication with outsourced vendors. The exemplary executable computer program works on pure SIP Server technology, hybrid SIP Server technology, and on Genesys-SIP suite. Furthermore, the exemplary executable computer program is independent of the vendors selling SIP telephony servers and is coded in Perl so it can be deployed on Unix as well as Windows servers. Of course, those skilled in the art appreciate that the above-described exemplary executable computer program is merely to be considered exemplary and is not to be considered limiting in any way.

Accordingly, the present invention enables parsing of standard SIP messages/events and the Genesys TSCP specific events tied with SIP messages. The present application parses out the SIP messaging/events for telephony calls as well as the user data messaging and vendor Genesys TSCP specific events. As such, thousands of calls flowing across an IP network can be parsed to provide details of particular calls or a generic overview of all calls. The present application can be used as a reporting tool based on Genesys-SIP Telephony suite as well as a troubleshooting tool in a call center. Furthermore, the present application can be used as an analysis tool as well as a call tracker.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the IP network as described herein may be a SIP network. Furthermore, the IP telephones as shown in FIG. 2 may be alternative user agents that are generally known and understood in the art. Additionally, the non-SIP events may include an additional, or alternative, suite of non-SIP events other than the Genesys TSCP suite of events.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet and circuit switched network transmission, such as the Genesys TSCP suite, represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus for retrieving information from an internet protocol network, comprising:
    a network interface that is in communication with the internet protocol network;
    a processor; and
    a memory storing instructions that, when executed by the processor, cause the processor to perform operations including:
        accessing a plurality of session initiation protocol events and a plurality of non-session initiation protocol events stored on the internet protocol network via the network interface, the plurality of session initiation protocol events being exchanged on the internet protocol network, the plurality of non-session initiation protocol events being transmitted from a non-internet protocol network to the internet protocol network;
        receiving a parsing parameter;
        parsing the plurality of session initiation protocol events and the plurality of non-session initiation protocol events accessed via the network interface based on the parsing parameter; and
        reporting parsing results of the parsing.

2. The apparatus as set forth in claim 1,
    wherein the plurality of session initiation protocol events and the plurality of non-session initiation protocol events are stored in a session initiation protocol entity on the internet protocol network.

3. The apparatus as set forth in claim 2, wherein the plurality of session initiation protocol events are exchanged between the session initiation protocol entity and an additional session initiation protocol entity on the internet protocol network, and
the plurality of non-session initiation protocol events are transmitted from a non-session initiation protocol entity on the non-internet protocol network to the session initiation protocol entity.

4. The apparatus as set forth in claim 3, wherein the plurality of non-session initiation protocol events include telephone library events, and
the session initiation protocol entity is one of a user agent, a proxy server, a redirect server, and a registrar.

5. The apparatus as set forth in claim 1, wherein the plurality of session initiation protocol events and the plurality of non-session initiation protocol events are stored in a plurality of session initiation protocol entities on the internet protocol network.

6. The apparatus as set forth in claim 5, wherein the plurality of session initiation protocol events are exchanged by the plurality of session initiation protocol entities on the internet protocol network, and
the plurality of non-session initiation protocol events are transmitted from a non-session initiation protocol entity on the non-internet protocol network to the plurality of session initiation protocol entities.

7. The apparatus as set forth in claim 1, wherein the processor determines data from each of the plurality of session initiation protocol events and the plurality of non-session initiation protocol events that corresponds to the parsing parameter, and
the parsing results include the data from each of the plurality of session initiation protocol events and the plurality of non-session initiation protocol events that corresponds to the parsing parameter.

8. The apparatus as set forth in claim 1, wherein each of the plurality of session initiation protocol events includes a start line, a header, and a body, and
the processor parses one of the start line, the header, and the body of each of the plurality of session initiation protocol events based on the parsing parameter.

9. A method for retrieving information from an internet protocol network, comprising:
receiving a parsing parameter;
accessing, via a network interface that is in communication with the internet protocol network, a plurality of session initiation protocol events and a plurality of non-session initiation protocol events stored on the internet protocol network, the plurality of session initiation protocol events being exchanged on the internet protocol network, the plurality of non-session initiation protocol events being transmitted from a non-internet protocol network to the internet protocol network;
parsing, by a processor, the plurality of session initiation protocol events and the plurality of non-session initiation protocol events accessed via the network interface based on the parsing parameter; and
reporting parsing results of the parsing.

10. The method as set forth in claim 9, further comprising:
wherein the plurality of session initiation protocol events and the plurality of non-session initiation protocol events are stored in a session initiation protocol entity on the internet protocol network.

11. The method as set forth in claim 10, wherein the plurality of session initiation protocol events are exchanged by the session initiation protocol entity and an additional session initiation protocol entity on the internet protocol network, and
the plurality of non-session initiation protocol events are transmitted from a non-session initiation protocol entity on the non-internet protocol network to the session initiation protocol entity.

12. The method as set forth in claim 11, wherein the plurality of non-session initiation protocol events include telephone library events, and
the session initiation protocol entity is one of a user agent, a proxy server, a redirect server, and a registrar.

13. The method as set forth in claim 9, wherein the plurality of session initiation protocol events and the plurality of non-session initiation protocol events are stored in a plurality of session initiation protocol entities on the internet protocol network.

14. The method as set forth in claim 13, wherein the plurality of session initiation protocol events are exchanged by the plurality of session initiation protocol entities on the internet protocol network, and
the plurality of non-session initiation protocol events are transmitted from a non-session initiation protocol entity on the non-internet protocol network to the plurality of session initiation protocol entities.

15. The method as set forth in claim 9, wherein data is determined from each of the plurality of session initiation protocol events and the plurality of non-session initiation protocol events that corresponds to the parsing parameter, and
the parsing results include the data from each of the plurality of session initiation protocol events and the plurality of non-session initiation protocol events that corresponds to the parsing parameter.

16. The method as set forth in claim 9, wherein each of the plurality of session initiation protocol events includes a start line, a header, and a body, and
the processor parses one of the start line, the header, and the body of each of the plurality of session initiation protocol events based on the parsing parameter.

17. A non-transitory computer-readable medium encoded with an executable computer program for retrieving information from an internet protocol network that, when executed by a processor, causes the processor to perform operations comprising:
receiving a parsing parameter;
accessing a plurality of session initiation protocol events and a plurality of non-session initiation protocol events stored on the internet protocol network, the plurality of session initiation protocol events being exchanged on the internet protocol network, the plurality of non-session initiation protocol events being transmitted from a non-internet protocol network to the internet protocol network;
parsing the plurality of session initiation protocol events and the plurality of non-session initiation protocol events accessed on the internet protocol network based on the parsing parameter; and
reporting parsing results of the parsing.

18. The non-transitory computer-readable medium as set forth in claim 17, wherein the plurality of session initiation protocol events and the plurality of non-session initiation protocol events are stored in a session initiation protocol entity on the internet protocol network, the plurality of session initiation protocol events are exchanged by the session initiation protocol entity and an additional session initiation protocol entity on the internet protocol network, and the plurality of non-session initiation protocol events are transmitted from a non-session initiation protocol entity on the non-internet protocol network to the session initiation protocol entity.

19. The non-transitory computer-readable medium as set forth in claim 17, wherein the plurality of session initiation protocol events and the plurality of non-session initiation protocol events are stored in a plurality of session initiation protocol entities on the internet protocol network, the plurality of session initiation protocol events are exchanged by the plurality of session initiation protocol entities on the internet protocol network, and the plurality of non-session initiation protocol events are transmitted from a non-session initiation protocol entity on the non-internet protocol network to the plurality of session initiation protocol entities.

20. The non-transitory computer-readable medium as set forth in claim 17, the operations further comprising:

determining data for each of the plurality of session initiation protocol events and the plurality of non-session initiation protocol events that corresponds to the parsing parameter, wherein the parsing results includes the data for each of the plurality of session initiation protocol events and the plurality of non-session initiation protocol events that corresponds to the parsing parameter.

* * * * *